(12) United States Patent
Endo et al.

(10) Patent No.: US 9,942,451 B2
(45) Date of Patent: Apr. 10, 2018

(54) PHOTOGRAPHING APPARATUS

(71) Applicant: HOYA CORPORATION, Tokyo (JP)

(72) Inventors: Ken Endo, Saitama (JP); Hiroaki Imagawa, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/428,513

(22) Filed: Feb. 9, 2017

(65) Prior Publication Data

US 2017/0251132 A1    Aug. 31, 2017

(30) Foreign Application Priority Data

Feb. 26, 2016 (JP) ................................. 2016-035085

(51) Int. Cl.
| | |
|---|---|
| *H04N 5/225* | (2006.01) |
| *G03B 17/02* | (2006.01) |
| *H04M 1/02* | (2006.01) |
| *H04B 1/3888* | (2015.01) |

(52) U.S. Cl.
CPC ........... *H04N 5/2252* (2013.01); *G03B 17/02* (2013.01); *G03B 2217/002* (2013.01); *H04B 1/3888* (2013.01); *H04M 1/0264* (2013.01)

(58) Field of Classification Search
CPC .................. H04N 5/2252; G03B 17/02; G03B 2217/002; G03B 5/00; G03B 3/10; G03B 13/32; G03B 2205/0053; G03B 2205/0046; H04B 1/3888; H04M 1/0264; G02B 7/04; G02B 7/026; G02B 7/08; F16F 1/18; F16F 1/021; F16F 2224/0208
See application file for complete search history.

(56) References Cited

U.S. PATENT DOCUMENTS

| | | | | |
|---|---|---|---|---|
| 2007/0280677 A1* | 12/2007 | Drake | ...................... | G02B 7/02 396/429 |
| 2009/0322931 A1* | 12/2009 | Cheng | ...................... | G02B 7/08 348/345 |
| 2010/0208089 A1* | 8/2010 | Chang | .................... | G03B 17/00 348/208.5 |

(Continued)

FOREIGN PATENT DOCUMENTS

| | | |
|---|---|---|
| JP | 2005-257784 | 9/2005 |
| JP | 2009-128525 | 6/2009 |

(Continued)

*Primary Examiner* — Roberto Velez
*Assistant Examiner* — Tuan Le
(74) *Attorney, Agent, or Firm* — Greenblum & Bernstein, P.L.C.

(57) ABSTRACT

A photographing apparatus includes a chassis, in which a recess is formed; the recess including at least one pair of inner wall surfaces which face each other; an imaging unit positioned in the recess; an intermediate frame which is interposed between the recess and the imaging unit, the intermediate frame including a pair of support walls which correspond to the pair of inner wall surfaces of the recess; a first cushioning member which is interposed between one of the pair of support walls of the intermediate frame and an adjacent outer wall surface of the imaging unit; and a second cushioning member which is interposed between the other of the pair of support walls of the intermediate frame and an adjacent inner wall surface of the pair of inner wall surfaces of the recess.

7 Claims, 5 Drawing Sheets

(56) References Cited

U.S. PATENT DOCUMENTS

| | | | | |
|---|---|---|---|---|
| 2012/0076487 A1* | 3/2012 | Wu | ........................ | G03B 17/14 |
| | | | | 396/533 |
| 2013/0209080 A1* | 8/2013 | Lee | ........................ | G02B 27/64 |
| | | | | 396/55 |
| 2013/0258475 A1* | 10/2013 | Lee | ........................ | G02B 7/102 |
| | | | | 359/554 |
| 2014/0132815 A1* | 5/2014 | Hsu | ..................... | H04N 5/2254 |
| | | | | 348/308 |
| 2014/0253284 A1* | 9/2014 | Peterson | .............. | H04M 1/185 |
| | | | | 340/3.1 |
| 2015/0189135 A1* | 7/2015 | Hsu | ..................... | H04N 5/2254 |
| | | | | 348/374 |
| 2015/0362828 A1* | 12/2015 | Patel | ................... | G03B 17/565 |
| | | | | 348/75 |

FOREIGN PATENT DOCUMENTS

| | | |
|---|---|---|
| JP | 2009-128626 | 6/2009 |
| JP | 2013-190772 | 9/2013 |

* cited by examiner

Fig.1
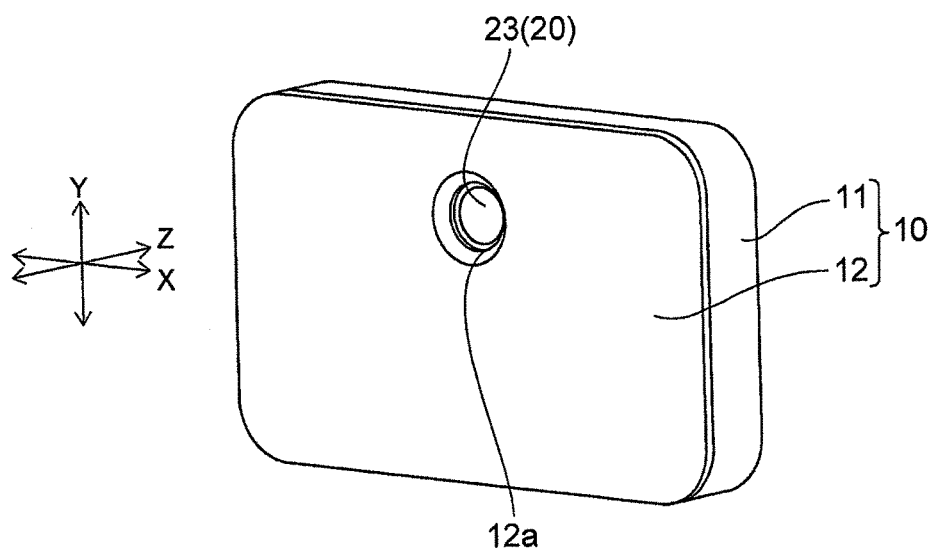
Fig.2A
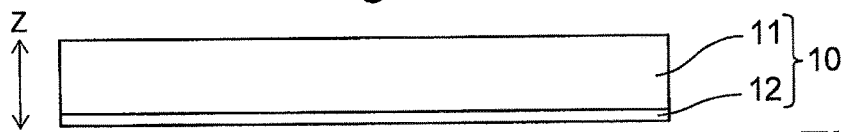
Fig.2B
Fig.2C
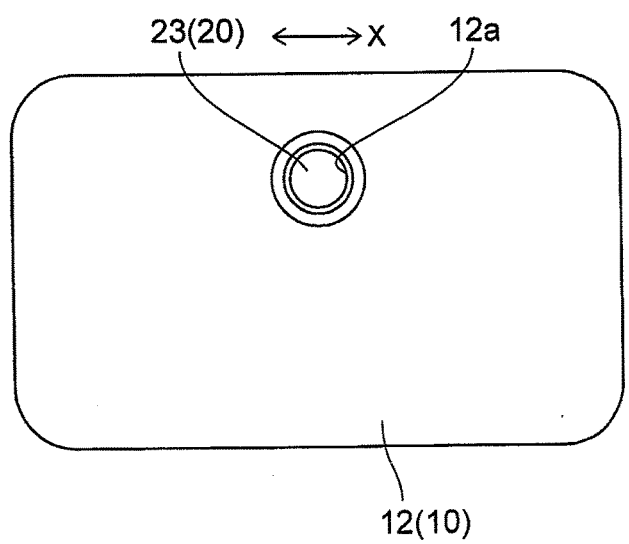
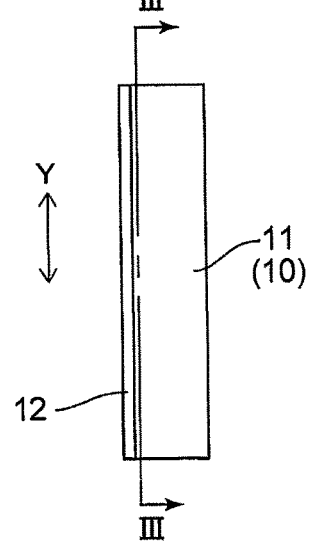

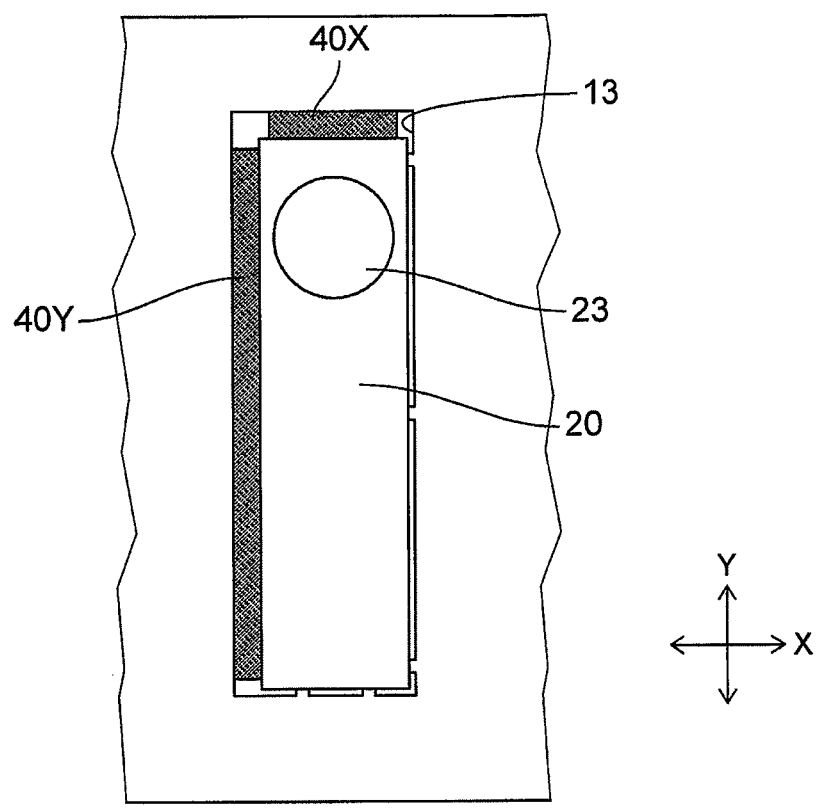

PHOTOGRAPHING APPARATUS

BACKGROUND OF THE INVENTION

1. Field of the Invention

The present invention relates to a photographing apparatus, more specifically to a photographing apparatus which includes an imaging unit and is capable of protecting the imaging unit from damage resulting from the shock of a fall, etc.

2. Description of the Related Art

In photographing apparatuses, particularly mobile photographing apparatuses such as smart phones, etc., one of the technical problems to be solved is how to protect the built-in imaging unit from damage when the apparatus is accidentally dropped (how to absorb the shock of a fall). In a typical shock cushioning structure, the imaging unit is basically sandwiched between cushioning members (shock-absorbing members) and the imaging unit sandwiched between the cushioning members is inserted into a recess formed in the chassis of a mobile photographing apparatus (disclosed in Patent Literatures 1 through 3).

Additionally, to enhance the positional accuracy of the imaging unit in the recess, the technical idea of making the imaging unit abut against aside formed in the recess is known in the art (disclosed in Patent Literature 4).

[Patent Literature 1] Japanese Unexamined Patent Publication No. 2009-128525

[Patent Literature 2] Japanese Unexamined Patent Publication No. 2009-128626

[Patent Literature 3] Japanese Unexamined Patent Publication No. 2013-190772

[Patent Literature 4] Japanese Unexamined Patent Publication No. 2005-257784

However, if the imaging unit is sandwiched between cushioning members (or wrapped in cushioning material) and inserted into the recess, there is a possibility of the resiliency of the cushioning members moving the imaging unit within the recess. If this moving direction is, in particular, orthogonal to the optical axis of the imaging unit, a positional deviation occurs between the forefront lens (a lens element nearest to the object) and the opening of the chassis, which becomes a cause of vignetting. In addition, if the imaging unit is made to abut against a side of the recess, the shock cushioning performance varies between the shock applied to the imaging unit from the direction in which any cushioning member exists and the shock applied to the imaging unit from the direction in which no cushioning members exist.

SUMMARY OF THE INVENTION

The present invention has been devised in view of the above described issues and provides a photographing apparatus which is capable of exercising high shock-cushioning performance while minimizing movement of the imaging unit within a recess formed in the chassis of the photographing apparatus.

According to an aspect of the present invention, a photographing apparatus is provided, including a chassis, in which a recess is formed, the recess including at least one pair of inner wall surfaces which face each other; an imaging unit positioned in the recess; an intermediate frame which is interposed between the recess and the imaging unit, the intermediate frame including a pair of support walls which correspond to the pair of inner wall surfaces of the recess; a first cushioning member which is interposed between one of the pair of support walls of the intermediate frame and an adjacent outer wall surface of the imaging unit; and a second cushioning member which is interposed between the other of the pair of support walls of the intermediate frame and an adjacent inner wall surface of the pair of inner wall surfaces of the recess.

It is desirable for the imaging unit to have a rectangular parallelepiped shape, which has a height, a width and a thickness.

It is desirable for the intermediate frame to be positioned to surround an outer peripheral surface of the imaging unit, the intermediate frame extending in a direction in which the imaging unit is the smallest in dimension among the height, the width and the thickness.

It is desirable for the pair of support walls to extend in an optical axis direction of a lens element, which is nearest to an object, of the imaging unit.

It is desirable for the one of the pair of support walls of the intermediate frame to face the outer wall surface of the imaging unit. The first cushioning member is interposed between an inner surface of the one of the pair of support walls of the intermediate frame and the outer wall surface of the imaging unit. An outer surface of the one of the pair of support walls of the intermediate frame and one of the pair of inner wall surfaces of the recess are in contact with each other.

It is desirable for the other of the pair of support walls of the intermediate frame to face the other of the pair of inner wall surfaces of the recess. The second cushioning member is interposed between an outer surface of the other of the pair of support walls of the intermediate frame and the other of the pair of inner wall surfaces of the recess. An inner surface of the other of the pair of support walls of the intermediate frame and an outer wall surface of the imaging unit are in contact with each other.

It is desirable for the first and second cushioning members to made of urethane foam or isoprene rubber.

The photographing apparatus according to the present invention can protect the imaging unit from shock without loss of the positional accuracy of the imaging unit in the recess that is formed in the chassis of the photographing apparatus.

The present disclosure relates to subject matter contained in Japanese Patent Application No. 2016-35085 (filed on Feb. 26, 2016) which is expressly incorporated herein by reference in its entirety.

BRIEF DESCRIPTION OF THE DRAWINGS

The present invention will be described below in detail with reference to the accompanying drawings in which:

FIG. 1 is a perspective view of a photographing apparatus provided with a shock cushioning structure according to the present invention, showing an example of the outward appearance of the photographing apparatus;

FIG. 2A is a front elevational view of the photographing apparatus shown in FIG. 1;

FIG. 2B is a plan view of the photographing apparatus shown in FIG. 1;

FIG. 2C is a side elevational view of the photographing apparatus shown in FIG. 1;

FIG. 6 is a view similar to that of FIG. 4, illustrating another comparative example of a shock cushioning structure.

DESCRIPTION OF THE PREFERRED EMBODIMENT

Figure 3:
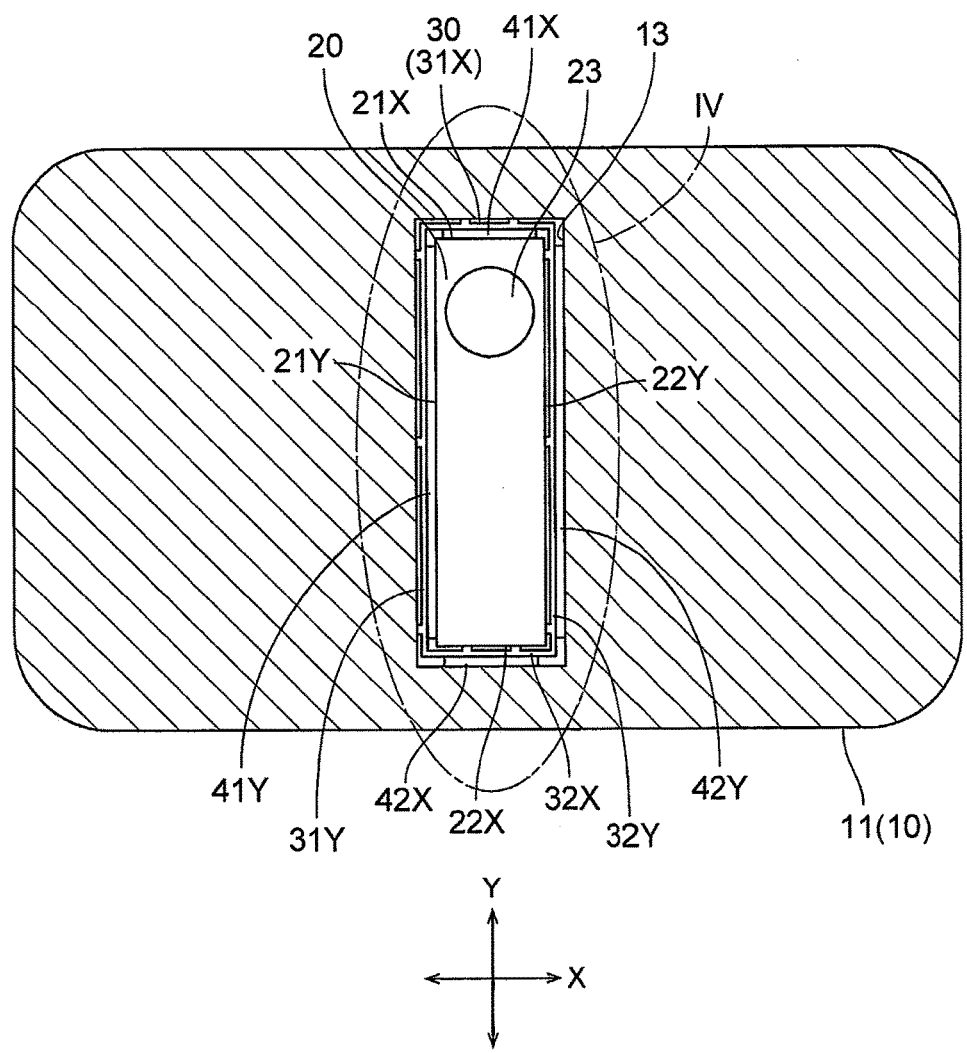
FIG. 3 is a sectional view taken along the line III-III shown in FIG. 2C.

An embodiment according to the present invention, applied to a smartphone (photographing apparatus) 10, will be described hereinbelow with reference to the accompanying drawings. As shown in FIGS. 1 and 2, the smartphone 10 is in the shape of a slim rectangular parallelepiped, the four corners of which are each formed as a ¼ cylindrical surface. The smartphone 10 is provided, on the front thereof at a position a little above the center thereof, with a photographic lens (forefront lens) 23. The smartphone 10 is provided therein with an imaging unit 20 which includes the photographic lens 23 as an element thereof. In FIGS. 1 and 2B, no internal elements of the smartphone 10 other than the photographic lens 23 is shown. Additionally, in the drawings from FIG. 3 onward, the imaging unit 20, which includes the photographic lens 23, is simply shown in outline. In the following descriptions, the height direction, the widthwise direction and the thickness (depthwise) direction of the smartphone 10 are defined as the Y-direction, the X-direction and the Z-direction, respectively. The chassis of the smartphone 10 is provided with a main chassis (chassis/rear chassis) 11 and a lid (front chassis) 12. A circular opening 12a through which the photographic lens 23 is exposed is formed in the lid 12. Although the chassis of the smartphone 10 includes the main chassis 11 and the lid 12, the split structure of the chassis of the smartphone 10 is not limited to this particular structure.

Figure 4:
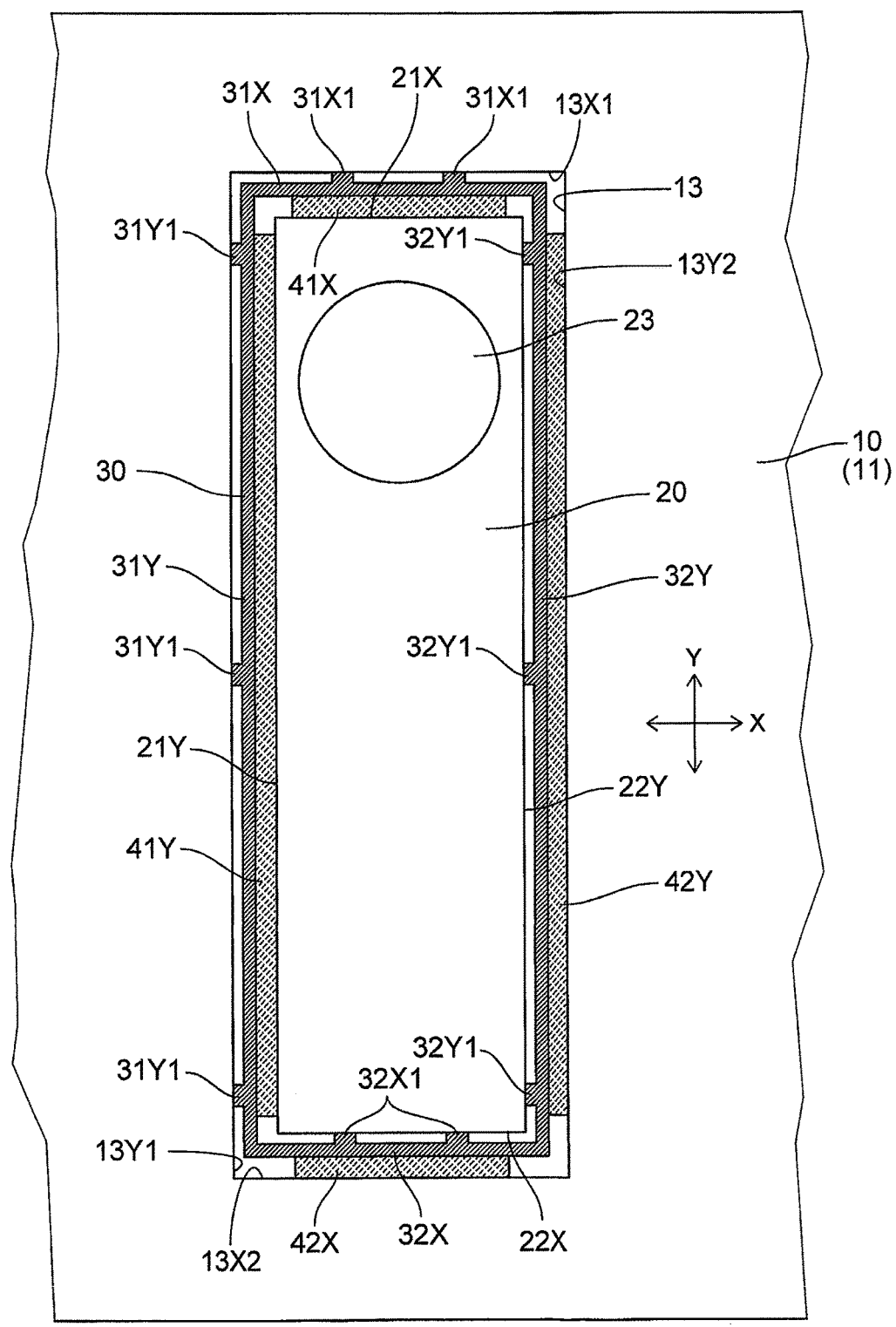
FIG. 4 is an enlarged view indicated by the chain line IV shown in FIG. 3.

As shown in FIGS. 3 and 4, a recess 13, having the shape of a rectangle in a front view and in which the imaging unit 20 is accommodated, is formed in the main chassis 11. In the illustrated embodiment, the length of the imaging unit 20 in the Y-direction (i.e., the height of the imaging unit 20) is greater than that in the X-direction (i.e., the width of the imaging unit 20), and the length of the imaging unit 20 in the Z-direction (i.e., the thickness of the imaging unit 20) is extremely small (in other words, the imaging unit 20 is thin). Specifically, for instance, the height (the length in the Y-direction), the width (the length in the X-direction) and the thickness (the length in the Z-direction) of the imaging unit 20 are approximately 41 mm, 11 mm and 6 mm, respectively. The photographic lens 23 is positioned in the vicinity of the upper end of the imaging unit 20 in the Y-direction.

In the illustrated embodiment, both end surfaces of the imaging unit 20 with respect to the Y-direction (upper and lower end surfaces of the imaging unit 20 with respect to FIGS. 3) are defined as X-direction outer wall surfaces 21X and 22X, respectively, and both end surfaces of the imaging unit 20 with respect to the X-direction (left and right end surfaces of the imaging unit 20 with respect to FIGS. 3) are defined as Y-direction outer wall surfaces 21Y and 22Y, respectively. In addition, inner walls surfaces of the recess 13 at both ends thereof with respect to the Y-direction (upper and lower ends with respect to FIG. 3) are defined as X-direction inner wall surfaces 13X1 and 13X2, respectively, and inner walls surfaces of the recess 13 at both ends thereof with respect to the X-direction (left and right ends with respect to FIG. 3) are defined as Y-direction inner wall surfaces 13Y1 and 13Y2, respectively.

The smartphone 10 is provided in the recess 13 with an intermediate frame 30 which is installed (interposed) between the imaging unit 20 and the recess 13. To correspond to the shape of the recess 13, the intermediate frame 30 is shaped into a rectangular frame as viewed in the Z-direction; the length of the intermediate frame 30 in the Y-direction is greater than that in the X-direction, and the length of the intermediate frame 30 in the Z-direction is extremely small. The intermediate frame 30 is provided with an X-direction support wall 31X which is positioned between the X-direction outer wall surface 21X of the imaging unit 20 and the X-direction inner wall surface 13X1 of the recess 13, and is provided with an X-direction support wall 32X which is positioned between the X-direction outer wall surface 22X of the imaging unit 20 and the X-direction inner wall surface 13X2 of the recess 13. In addition, the intermediate frame 30 is provided with a Y-direction support wall 31Y which is positioned between the Y-direction outer wall surface 21Y of the imaging unit 20 and the Y-direction inner wall surface 13Y1 of the recess 13, and is provided with a Y-direction support wall 32Y which is positioned between the Y-direction outer wall surface 22Y of the imaging unit 20 and the Y-direction inner wall surface 13Y2 of the recess. The intermediate frame 30 surrounds the outer surface (outer peripheral surface) of the imaging unit 20 that has the smallest dimensions among the height direction (the Y-direction), the widthwise direction (the X-direction) and the thickness direction (the Z-direction); in this particular embodiment, the outer surface in the thickness direction (Z-direction) has the smallest dimensions. The Z-direction is a direction parallel to the optical axis of the photographing lens (lens element) 23. The X-direction support walls 31X and 32X and the Y-direction support walls 31Y and 32Y also each extend in the Z-direction.

The X-direction support wall 31X is provided with two frame projections 31X1 which are spaced from each other in the lengthwise direction of the X-direction support wall 31X (i.e., in the horizontal direction with respect to FIG. 4). Likewise, the X-direction support wall 32X is provided with two frame projections 32X1 which are spaced from each other in the lengthwise direction of the X-direction support wall 31X (i.e., in the horizontal direction with respect to FIG. 4). One of the two frame projections 31X1 (specifically the left frame projection 31X1 with respect to FIG. 4) and the corresponding frame projection 32X1 (specifically the left frame projection 32X1 with respect to FIG. 4) project in the same direction (specifically the upward direction with respect to FIG. 4) in a Y-Z plane, and the other frame projection 31X1 (specifically the right frame projection 31X1 with respect to FIG. 4) and the corresponding frame projection 32X1 (specifically the right frame projection 32X1 with respect to FIG. 4) project in the same direction (specifically the upward direction with respect to FIG. 4) in another Y-Z plane.

The Y-direction support wall 31Y is provided with three frame projections 31Y1 which are arranged at regular intervals and spaced from one another in the lengthwise direction of the Y-direction support wall 31Y (i.e., in the vertical direction with respect to FIG. 4). Likewise, the Y-direction support wall 32Y is provided with three frame projections 32Y1 which are arranged at regular intervals and spaced from each other in the lengthwise direction of the Y-direction support wall 32Y (i.e., in the vertical direction with respect to FIG. 4). One of the three frame projections 31Y1 (specifically the upper frame projection 31Y1 with respect to FIG. 4) and the corresponding frame projection 32Y1 (specifically the upper frame projection 32Y1 with respect to FIG. 4) project in the same direction (specifically the leftward direction with respect to FIG. 4) in an X-Z plane, another one of the three frame projections 31Y1 (specifically the middle frame projection 31Y1 with respect to FIG. 4) and the corresponding frame projection 32Y1 (specifically the middle frame projection 32Y1 with respect to FIG. 4) project in the same direction (specifically the leftward direction with respect to FIG. 4) in another X-Z plane, and another frame projection 31Y1 (specifically the lower frame projection 31Y1 with respect to FIG. 4) and the corresponding frame projection 32Y1 (specifically the lower frame projection 32Y1 with respect to FIG. 4) project in the same direction (specifically the leftward direction with respect to FIG. 4) in yet another X-Z plane.

The smartphone 10 is provided with two short cushioning members 41X and 42X and two long cushioning members 41Y and 42Y which each have a flat-plate shape and are inserted in between the recess 13, the imaging unit 20 and the intermediate frame 30 in a manner which will be discussed below. First, the short cushioning member 41X (shown in an upper part of FIG. 4), which is one of the two short cushioning members 41X and 42X that are elongated in the X-direction, is inserted in between the X-direction support wall 31X of the intermediate frame 30 and the X-direction outer wall surface 21X of the imaging unit 20 in a compressed state, while the short cushioning member 42X (shown in a lower part of FIG. 4), which is the other of the two short cushioning members 41X and 42X, is inserted in between the X-direction inner wall surface 13X2 of the recess 13 and the X-direction support wall 32X of the intermediate frame 30 in a compressed state.

The long cushioning member 41Y (shown in a left part of FIG. 4), which is one of the two long cushioning members 41Y and 42Y that are elongated in the Y-direction, is inserted in between the Y-direction support wall 31Y of the intermediate frame 30 and the Y-direction outer wall surface 21Y of the imaging unit 20 in a compresses state, while the long cushioning member 42Y (shown in a right part of FIG. 4), which is the other of the two long cushioning members 41Y and 42Y, is inserted in between the Y-direction inner wall surface 13Y2 of the recess 13 and the Y-direction support wall 32Y of the intermediate frame 30 in a compressed state. The short cushioning members 41X and 42X and the long cushioning members 41Y and 42Y are made of a compressible material which produces a repulsive force in a compressed state, e.g., urethane foam (UF), isoprene rubber (IR), etc.

Accordingly, in a state where the short cushioning members 41X and 42X and the long cushioning members 41Y and 42Y are inserted in between the recess 13, the imaging unit 20 and the intermediate frame 30 as shown in FIG. 4, the two frame projections 31X1 of the X-direction support wall 31X of the intermediate frame 30, which are shown in an upper part of FIG. 4, are in mechanical contact with the X-direction inner wall surface 13X1 of the recess 13, while the two frame projections 32X1 of the X-direction support wall 32X of the intermediate frame 30, which are shown in a lower part of FIG. 4, are in mechanical contact with the X-direction outer wall surface 22X of the imaging unit 20. These mechanical contacts define the mechanical position of the imaging unit 20 in the Y-direction in the recess 13. On the other hand, the shock cushioning effect in the Y-direction in the recess 13 of the imaging unit 20 is achieved by the upper and lower pair of short shock cushioning members 41X and 42X.

Likewise, the three frame projections 31Y1 of the Y-direction support wall 31Y of the intermediate frame 30, which are shown in a left part of FIG. 4, are in mechanical contact with the Y-direction inner wall surface 13Y1 of the recess 13, while the three frame projections 32Y1 of the Y-direction support wall 32Y of the intermediate frame 30, which are shown in a right part of FIG. 4, are in mechanical contact with the Y-direction outer wall surface 22Y of the imaging unit 20. These mechanical contacts define the mechanical position of the imaging unit 20 in the X-direction in the recess 13. On the other hand, the shock cushioning effect in the X-direction in the recess 13 of the imaging unit 20 is achieved by the left and right pair of short shock cushioning members 41Y and 42Y.

As seen from above, in the above illustrated embodiment of the photographing apparatus (smartphone 10), the two short cushioning members 41X and 42X and two long cushioning members 41Y and 42Y are not positioned symmetrically with respect to the center of the imaging unit 20 due to the installation position of the intermediate frame 30 relative to the recess 13; namely, one of the X-direction support walls 31X and 32X that are formed as a pair is in mechanical contact with the X-direction inner wall surface 13X1 of the recess 13 and the other is in mechanical contact with the X-direction outer wall surface 22X of the imaging unit 20, and one of the Y-direction support walls 31Y and 32Y that are formed as a pair is in mechanical contact with the Y-direction inner wall surface 13Y1 of the recess 13 and the other is in mechanical contact with the Y-direction outer wall surface 22Y of the imaging unit 20. This makes it possible to enhance the positional accuracy of the imaging unit 20 in the recess 13.

In addition, the short cushioning members 41X and 42X and the long cushioning members 41Y and 42Y protect the imaging unit 20, specifically in a manner which will be discussed below.

For instance, when the smartphone 10 falls with the X-direction outer wall surface 22X side of the imaging unit 20 facing down, the shock that the imaging unit 20 (the X-direction outer wall surface 22X) is subjected to is absorbed by the short cushioning member 42X. Similarly, when the smartphone 10 falls with the X-direction outer wall surface 21X side of the imaging unit 20 facing down, the shock that the imaging unit 20 (the X-direction outer wall surface 21X) is subjected to is absorbed by the short cushioning member 41X.

In addition, when the smartphone 10 falls with the Y-direction outer wall surface 21Y side of the imaging unit 20 facing down, the shock that the imaging unit 20 (the Y-direction outer wall surface 21Y) is subjected to is absorbed by the long cushioning member 41Y. Similarly, when the smartphone 10 falls with the Y-direction outer wall surface 22Y side of the imaging unit 20 facing down, the shock that the imaging unit 20 (the Y-direction outer wall surface 22Y) is subjected to is absorbed by the long cushioning member 42Y.

The X-direction support walls 31X and 32X, which are formed as a pair, are connected via the Y-direction support walls 31Y and 32Y, and the Y-direction support walls 31Y and 32Y, which are formed as a pair, are connected via the X-direction support walls 31X and 32X in the above illustrated embodiment of the photographing apparatus (smartphone 10); however, for instance, the X-direction support walls 31X and 32X can be connected via a connecting member or members which extend parallel to the page of FIG. 4, and the Y-direction support walls 31Y and 32Y can be connected via a connecting member or members which extend parallel to the page of FIG. 4. In addition, the X-direction support walls 31X and 32X and the Y-direction support walls 31Y and 32Y only need to be connected mechanically with the imaging unit 20 accommodated in the recess 13; therefore, the X-direction support walls 31X and 32X and the Y-direction support walls 31Y and 32Y can be mechanically connected at any stage.

The formation of the frame projections 31X1, 32X1, 31Y1 and 32Y1 of the intermediate frame 30 reduces the contact area of the intermediate frame 30 with the recess 13 and the imaging unit 20, thus being effective at ensuring the contact of the intermediate frame 30 with the recess 13 and the imaging unit 20. However, it is possible to omit the frame projections 31X1, 32X1, 31Y1 and 32Y1 to make the X-direction support wall 31X and the Y-direction support wall 31Y, which are each formed as a flat plate, respectively come in contact with the X-direction inner wall surface 13X1 and the Y-direction inner wall surface 13Y1 of the recess 13 that are also flat in shape, and to make the X-direction support wall 32X and the Y-direction support wall 32Y, which are each formed into a flat plate, respectively come in contact with the X-direction outer wall surface 22X and the Y-direction outer wall surface 22Y of the imaging unit 20 that are also flat in shape.

Figure 5:
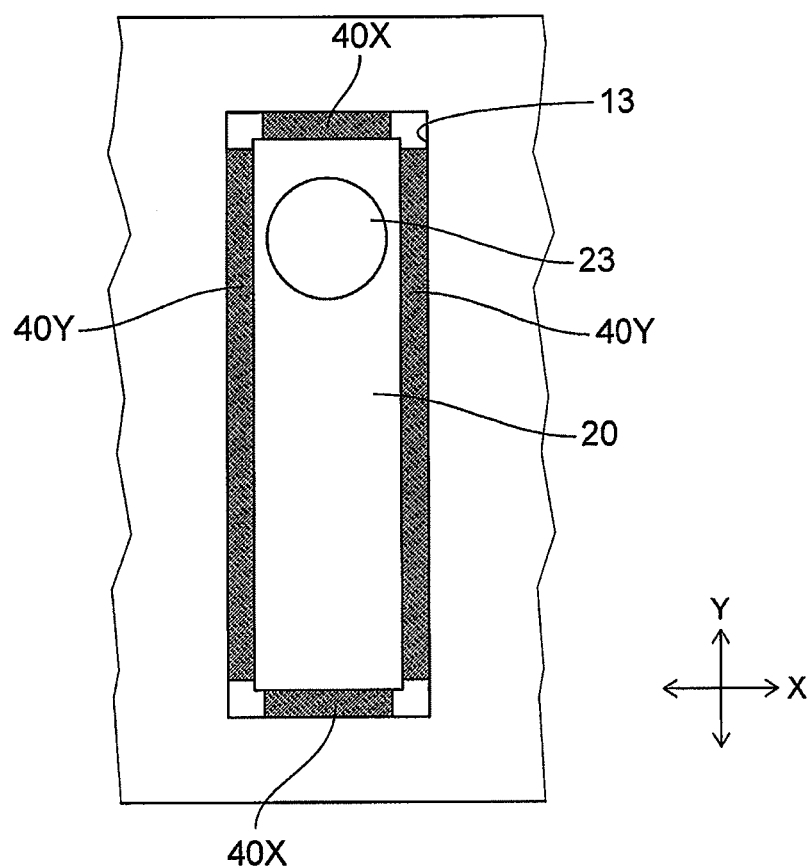
FIG. 5 is a view similar to that of FIG. 4, illustrating a comparative example of a shock cushioning structure.

FIG. 5 is a reference example (comparative example) of a shock cushioning structure in which two short cushioning members 40X and two long cushioning members 40Y are arranged between the recess 13 and the imaging unit 20 to be equally spaced therein without the intermediate frame 30 interposed therebetween (the imaging unit 20 is surrounded by the two short cushioning members 40X and the two long cushioning members 40Y and inserted into the recess 13). In this example, deformation of the short cushioning members 40X and 40Y deteriorates the positional accuracy of the imaging unit 20 in the recess 13 in the X-direction and the Y-direction.

FIG. 6 is another reference example (comparative example) of a shock cushioning structure in which one side of the imaging unit 20 with respect to the X-direction and one side of the imaging unit 20 with respect to the Y-direction are each brought in mechanical contact with an inner wall surface of the recess 13, and in which one short cushioning member 40X is positioned between the other side of the imaging unit 20 with respect to the Y-direction and an inner wall surface of the recess 13 and one long cushioning member 40Y is positioned between the other side of the imaging unit 20 with respect to the X-direction and another inner wall surface of the recess 13. In this example, the positional accuracy of the imaging unit 20 in the recess 13 is improved; however, the shock-resisting performance varies in different directions.

Although the shock cushioning structure of the above illustrated embodiment of the photographing apparatus absorbs shock in the X-direction and the Y-direction which is applied to the slim imaging unit 20, which is greater in length in the Y-direction than in the X-direction and extremely small in length (thickness) in the Z-direction, a similar shock cushioning structure can be provided also in the Z-direction (thickness direction). Conversely, a certain degree of shock cushioning effect can be obtained even if a shock cushioning structure according to the present invention is applied only to one of the X-direction and the Y-direction.

Although the present invention has been applied to the shock cushioning structure of the smartphone 10 for the imaging unit 20 that is vertically long in a front view in the above illustrated embodiment, the present invention can be applied without regard to the shape of the imaging unit 20.

Although the above illustrated embodiment of the present invention is applied to the smartphone 10 that is equipped with the imaging unit 20, the present invention is applicable to any smart device and photographing apparatus in general that can possibly (accidentally) fall.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A photographing apparatus comprising:
a chassis, in which a recess is formed, said recess including at least one pair of inner wall surfaces which face each other;
an imaging unit positioned in said recess;
an intermediate frame which is interposed between said recess and said imaging unit, the intermediate frame including a pair of support walls which correspond to said pair of inner wall surfaces of said recess;
a first cushioning member which is interposed between one of said pair of support walls of said intermediate frame and an adjacent outer wall surface of said imaging unit; and
a second cushioning member which is interposed between the other of said pair of support walls of said intermediate frame and an adjacent inner wall surface of said pair of inner wall surfaces of said recess.

2. The photographing apparatus according to claim 1, wherein said imaging unit has a rectangular parallelepiped shape, which has a height, a width and a thickness.

3. The photographing apparatus according to claim 2, wherein said intermediate frame is positioned to surround an outer peripheral surface of said imaging unit, said intermediate frame extending in a direction in which said imaging unit is the smallest in dimension among said height, said width and said thickness.

4. The photographing apparatus according to claim 2, wherein said one of said pair of support walls of said intermediate frame faces said outer wall surface of said imaging unit,
wherein said first cushioning member is interposed between an inner surface of said one of said pair of support walls of said intermediate frame and said outer wall surface of said imaging unit, and
wherein an outer surface of said one of said pair of support walls of said intermediate frame and one of said pair of inner wall surfaces of said recess are in contact with each other.

5. The photographing apparatus according to claim 4, wherein the other of said pair of support walls of said intermediate frame faces the other of said pair of inner wall surfaces of said recess,
wherein said second cushioning member is interposed between an outer surface of said other of said pair of support walls of said intermediate frame and the other of said pair of inner wall surfaces of said recess, and
wherein an inner surface of said other of said pair of support walls of said intermediate frame and an outer wall surface of said imaging unit are in contact with each other.

6. The photographing apparatus according to claim 1, wherein said pair of support walls extend in an optical axis direction of a lens element, which is nearest to an object, of said imaging unit.

7. The photographing apparatus according to claim 1, wherein the first and second cushioning members are made of urethane foam or isoprene rubber.

\* \* \* \* \*